US008532974B2

(12) United States Patent
Guo et al.

(10) Patent No.: US 8,532,974 B2
(45) Date of Patent: Sep. 10, 2013

(54) DEVELOPING SYSTEM AND METHOD FOR OPTIMIZING THE ENERGY CONSUMPTION OF AN APPLICATION PROGRAM FOR A DIGITAL SIGNAL PROCESSOR

(75) Inventors: Zhi-Yang Guo, Taipei (TW); Yu-Chung Tsao, Taoyuan County (TW); Yu-Kai Wang, Taipei County (TW); Mao-Sung Wu, Taipei County (TW); Chun Hsieh, Tainan (TW); Tsai-Lin Lee, Taipei (TW)

(73) Assignee: Sentelic Corporation, Neihu Dist., Taipei (TW)

( * ) Notice: Subject to any disclaimer, the term of this patent is extended or adjusted under 35 U.S.C. 154(b) by 337 days.

(21) Appl. No.: 12/892,492

(22) Filed: Sep. 28, 2010

(65) Prior Publication Data

US 2012/0078606 A1 Mar. 29, 2012

(51) Int. Cl.
G06F 9/45 (2006.01)

(52) U.S. Cl.
USPC ............................................. 703/22; 717/140

(58) Field of Classification Search
USPC .......................................... 703/22; 717/140
See application file for complete search history.

(56) References Cited

U.S. PATENT DOCUMENTS

| 2005/0204316 | A1* | 9/2005 | Nebel et al. | 716/2 |
| 2011/0016342 | A1* | 1/2011 | Rowan et al. | 713/340 |
| 2011/0218791 | A1* | 9/2011 | Lee et al. | 703/16 |

OTHER PUBLICATIONS

Tajana Simunie, NPL, "Source Code Optimization and Profiling of Energy Consumption in Embedded Systems", ISSS 2000.*
Armita Peymandoust, NPL, "Low Power Embedded Software Optimization using Symbolic Algebra", 2002.*
Chiyoung Seo, NPL, "An Energy Consumption Framework for Distributed Java-Based Systems", 2007.*
Manish Verma, NPL, "Compilation and Simulation Tool Chain for Memory Aware Energy Optimizations", 2006.*
Tajana Simunie, NPL, "Cycle Accurate simulation of Energy Consumption in Embedded Systems", 1999.*

* cited by examiner

*Primary Examiner* — Omar Fernandez Rivas
*Assistant Examiner* — Angel Calle
(74) *Attorney, Agent, or Firm* — Winston Hsu; Scott Margo

(57) ABSTRACT

A method for optimizing energy consumption of an application program for a DSP includes a program code generating unit is adapted to edit and generate a program code, a program compiling unit is adapted to receive the program code, and according to the program code and the instructional wise energy consumption database generate a plurality of assembly codes, and a DSP simulator adapted to receive the assembly codes and at least one stimulus to simulate the total and the amount of energy every instruction of the assembly codes consumes and transmit the results to the program compiling unit. The program compiling unit modifies the compiling scheme to recompile the program code and transmits the new assembly codes to the DSP simulator, until the simulation results reach or are lower than a predetermined energy consumption value.

12 Claims, 3 Drawing Sheets

DEVELOPING SYSTEM AND METHOD FOR OPTIMIZING THE ENERGY CONSUMPTION OF AN APPLICATION PROGRAM FOR A DIGITAL SIGNAL PROCESSOR

BACKGROUND OF THE INVENTION

1. Field of the Invention

The present invention relates to a developing system and method for optimizing the energy consumption of an application program for a digital signal processor (DSP), and more particularly to a system and method which utilize a DSP simulator to simulate the total energy consumption and the amount of energy consumption of each instruction consumes and make a statistics of the times each instruction is used and make a bit-width accuracy tolerability of each instructions of the application program. Then, transmit the simulation results to a program compiling unit or a program code generating unit to correct the compiling scheme or the programming style to meet the energy consumption limitation.

2. Description of the Prior Art

Digital Signal Processor (DSP) has been widely applied in various data processing applications. The operation principle of DSP is as follows: received a digital signal which is converted from analog signal, the digital signal is composed of 0 or 1, and then the digital signal is modified, deleted or enhanced, and transfer the signal to other system chips or components, so that not only programmability is available, but also the real-time operating speed is fast. In the development history of the DSP, it can be observed that, since 1982, a DSP with 50% decrease of power consumption can be manufactured every 18 months, and its energy consumption to performance ratio can be reduced by 10 times every 5 years, so that a current DSP can real-time execute a large quantity of instruction operations at very high accuracy and processing speed, and become a core component of modern electronic products. However, with now a day ever down scaling CMOS Silicon process, the DSP 50% decrease of power consumption every 18 months is approaching its physical limitation. In other words, it is getting harder and harder to meet another 50% decrease in every 18 months with the physical scale we are having right now. As within every processor the power consumption of a processor have a lot to do with the program and application it carries. So if the programming coding style and program algorithm of the application program can match with the different DSP architectures, with both software and hardware matching together it can largely decrease the energy consumption without kept pushing the hardware manufacture process advancing And since there are so many types of DSP in the current practice, average program developer can hardly memorize and understand different architectures between every DSP.

Generally, in order to satisfy the speed requirement for an application, the operational software program of the DSP is generally designed as in algorithmically optimized for such an application. In terms of hardware, the power consumption of the DSP is mainly related to the number of transistors involve in processing the computation process, the execution voltage of the DSP, and operating clock frequency. In another aspect, the algorithmic design in software program of the DSP decides the number of transistors participating in computation, the required operating clock frequency, and operating voltage. Therefore, in addition to develop a low-power-consumption DSP software program to match the hardware architecture of a DSP, actual power consumption of the application program for a DSP can also be reduced through software design by designing an algorithm with lower power consumption on software. With the demand of applied systems, the current DSP often needs to expand into a more complicated system. However, a current system for developing the DSP only provides a platform for compiling the DSP, and does not provide an effective solution for a developer to evaluate energy consumption at system, application and algorithm levels to optimize energy consumption performance of the DSP.

In view of this, during the development of the DSP, in order for a DSP developer to predict energy consumption information of the DSP when the DSP executes a program code, to optimize energy consumption and operational capability of the DSP, the inventor develops the present invention with years of experience and continuous research, development, and improvement.

SUMMARY OF THE INVENTION

The primary object of the present invention is to provide a developing system and method for optimizing an application program for a digital signal processor (DSP). According to a program code of a DSP which is generated by a program code generating unit, a program compiling unit compiles the program code and generates a plurality of assembly codes. A DSP simulator simulates energy consumption of such assembly codes and makes used instruction statistics of the assembly codes when the DSP receives a stimulus with the assembly codes, and transmits simulation results to the program code generating unit, for the program code generating unit to predict energy consumption information of the DSP when the DSP executes the program code.

Another object of the present invention is to provide a developing system and method for optimizing a DSP. A DSP simulator simulates energy consumption and used instruction statistics of the DSP when the DSP executes a stimulus with assembly codes generated by a program compiling unit, and transmits simulation results to a program code generating unit, so that when the simulation results do not reach a predetermined energy consumption performance, the program code generating unit modifies the program code according to the simulation results, and transmits the modified program code to the program compiling unit to re-generate assembly codes.

In order to achieve the aforementioned objectives, a developing system for optimizing a DSP according to the present invention includes an instructional wise energy consumption database, a program code generating unit, a program compiling unit, and a DSP simulator. The instructional wise energy consumption database includes energy consumption data of a DSP when the DSP executes at least one instruction. The program code generating unit is adapted to edit and generate a program code. The program compiling unit is adapted to receive the program code, and according to the program code and the instructional wise energy consumption database, compile the program code, and generate a plurality of assembly codes. The DSP simulator is adapted to receive the assembly codes and at least one stimulus, to simulate energy consumption and used instruction statistics of the DSP when the DSP executes the stimulus.

In practice, the DSP simulator transmits the simulation results of the assembly codes and the stimulus to the program code generating unit. When the simulation results are higher than a predetermined energy consumption value, the program code generating unit modifies the program code according to the simulation results, and re-transmits the modified program code to the program compiling unit, so that the program compiling unit re-generates assembly codes for the DSP simulator to perform simulation, until the simulation results reach or are lower than the predetermined energy consumption value.

Other objects, advantages and novel features of the present invention will become more apparent from the following detailed description when taken in conjunction with the accompanying drawings.

DETAILED DESCRIPTION OF THE INVENTION

Figure 1:
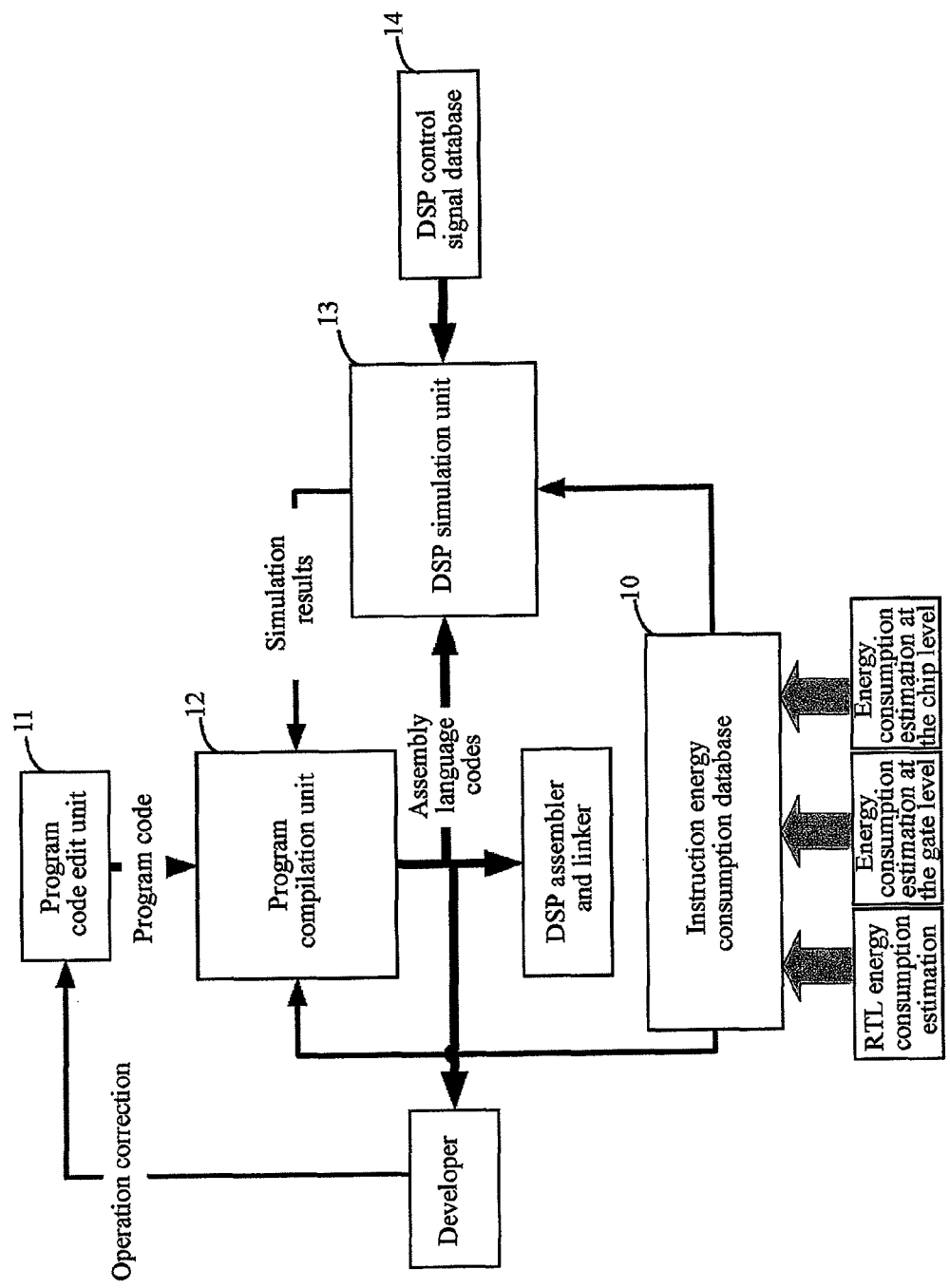
FIG. 1 is a functional block diagram of a developing system for optimizing a DSP according to an embodiment of the present invention.

FIG. 1 is a functional block diagram of a developing system for optimizing an application program for a DSP according to an embodiment of the present invention. Referring to FIG. 1, the system includes an instructional wise energy consumption database 10, a program code generating unit 11, a program compiling unit 12, a DSP simulator 13, and a DSP stimulus database 14.

Figure 2:
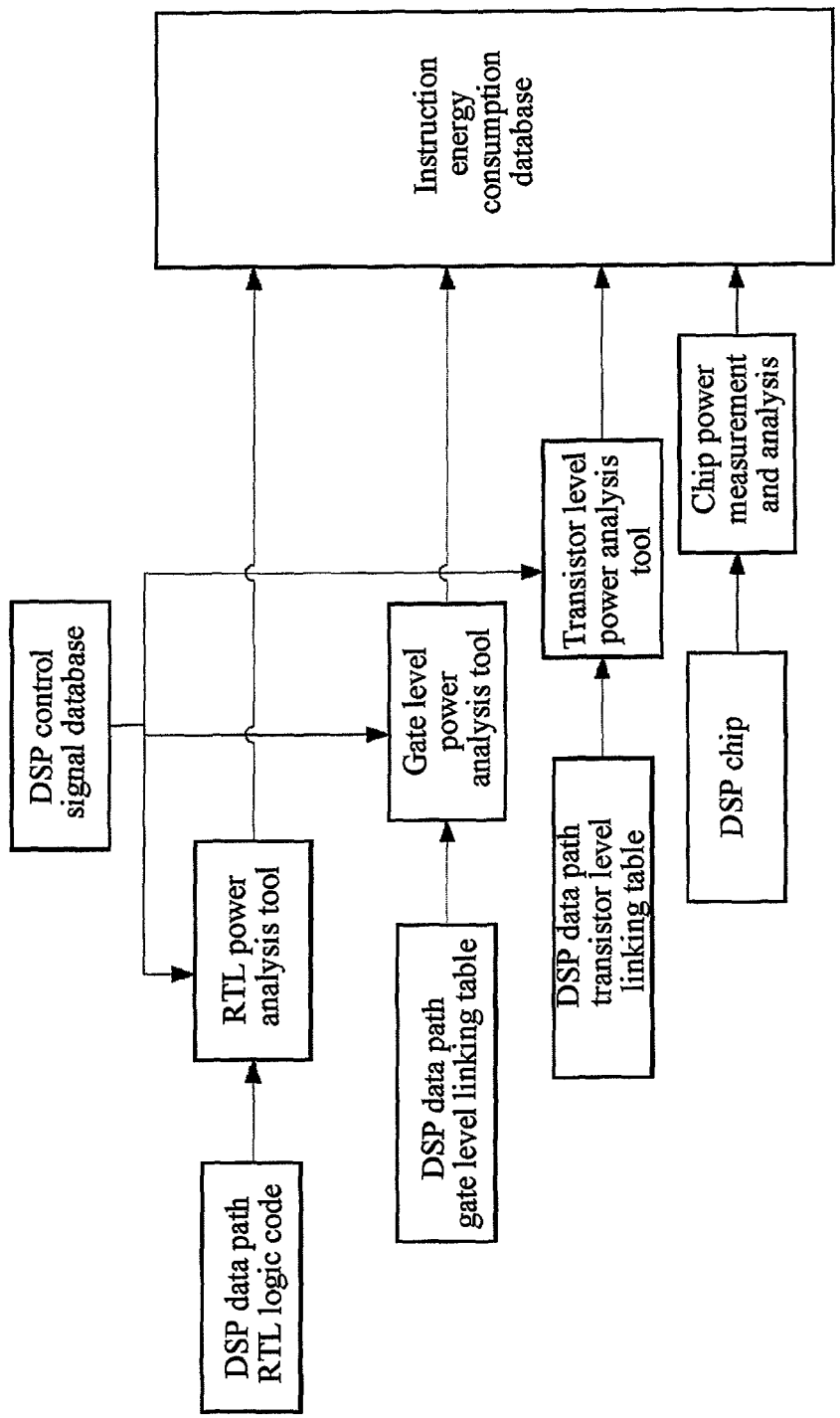
FIG. 2 is a functional block diagram of the embodiment of FIG. 1 at the time of establishing an instructional wise energy consumption database.

The instructional wise energy consumption database 10 includes energy consumption data of a DSP when the DSP executes at least one instruction. As shown in FIG. 2, the energy consumption data is established by analyzing the operational resources of the actual hardware circuit of the DSP at the time when the DSP is executing one instruction The instructional wise energy consumption database keep the information of the energy consumption according to the involving operational resources is divided into three structural level of category: the register transmission level, the gate level, and the chip circuit level, so that the program compiling unit can consult the database and compare all tree three category of the information and make a better energy consumption-wise decision of compiling scheme. The information which instructional wise energy consumption database 10 is base on the actual hardware of the DSP when the DSP executes a set of instructions, and is establish by the involving operational transistor number, the operating voltage, operating clock frequency, the pipeline arrangement, the branch prediction, the storage bit-width memory allocation, the sequence of instructions, and register bit width involving in each instruction.

The program code generating unit 11 is for program developer to compose and edit a set of program code, and within the program code also provides the total energy consumption limitation and the bit-width memory allocation of each instruction of the application program code when the program code perform an application.

The program compiling unit 12 is adapted to receive the program code and the total energy consumption limitation and the bit-width memory allocation which generated by the program code generating unit 11, and compiles the program code according to the instructional wise energy consumption database 10, so as to generate a set of assembly codes.

The DSP stimulus test bench database 14 is established by a combination of all possible real-time scenario stimulus of the application.

The DSP simulator 13 is adapted to receive the assembly codes generated by the program compiling unit 12 and the stimulus from the DSP stimulus test bench database 14. DSP simulator 13 can simulate the total energy consumption and make used instruction statistics with the energy consumption related to each instruction of the assembly codes, and also simulate the actual memory space need for every instruction under such a stimulus. The simulated results are transfer to the program compiling unit 12. The program compiling unit 12 will compare the result with the predetermined energy consumption limitation, if the result is higher than the pre-set total energy consumption value, the program compiling unit 12 will recompile the program code according to the result of the distribution and share energy consumption instructions and adjust the compiling scheme to lower the highly energy consume instructions to meet to pre-set limitation. The program compiling unit 12 will also receive the memory space allocation result to check if there is any memory exceeding allocation coding exists. And adjust the compiling scheme to allocation the minimum needing memory space to save both save memory and save the extra energy need for accessing those unneeded memory space.

Once the program compiling unit 12 exhausts the entire existing compiling scheme the program compiling unit 12 will transfer the failing result to the program code generating unit 11, to inform the program developer that with all the existing compiling scheme it's not possible to meet the energy consumption limitation, the program developer can either adjust the energy consumption limitation or adjust the coding style or the change to different algorithm to the application program. The DSP simulator will also transfer the simulated result to the program compiling unit 12 to let the program developer to consult to the result and understand which part of the program can be adjust, according to the used instruction statistics with the energy consumption related to each instruction of the assembly codes. Repeating the result transfer flow will enable the program developer to optimize the application program and also push the energy consumption to the limit.

Figure 3:
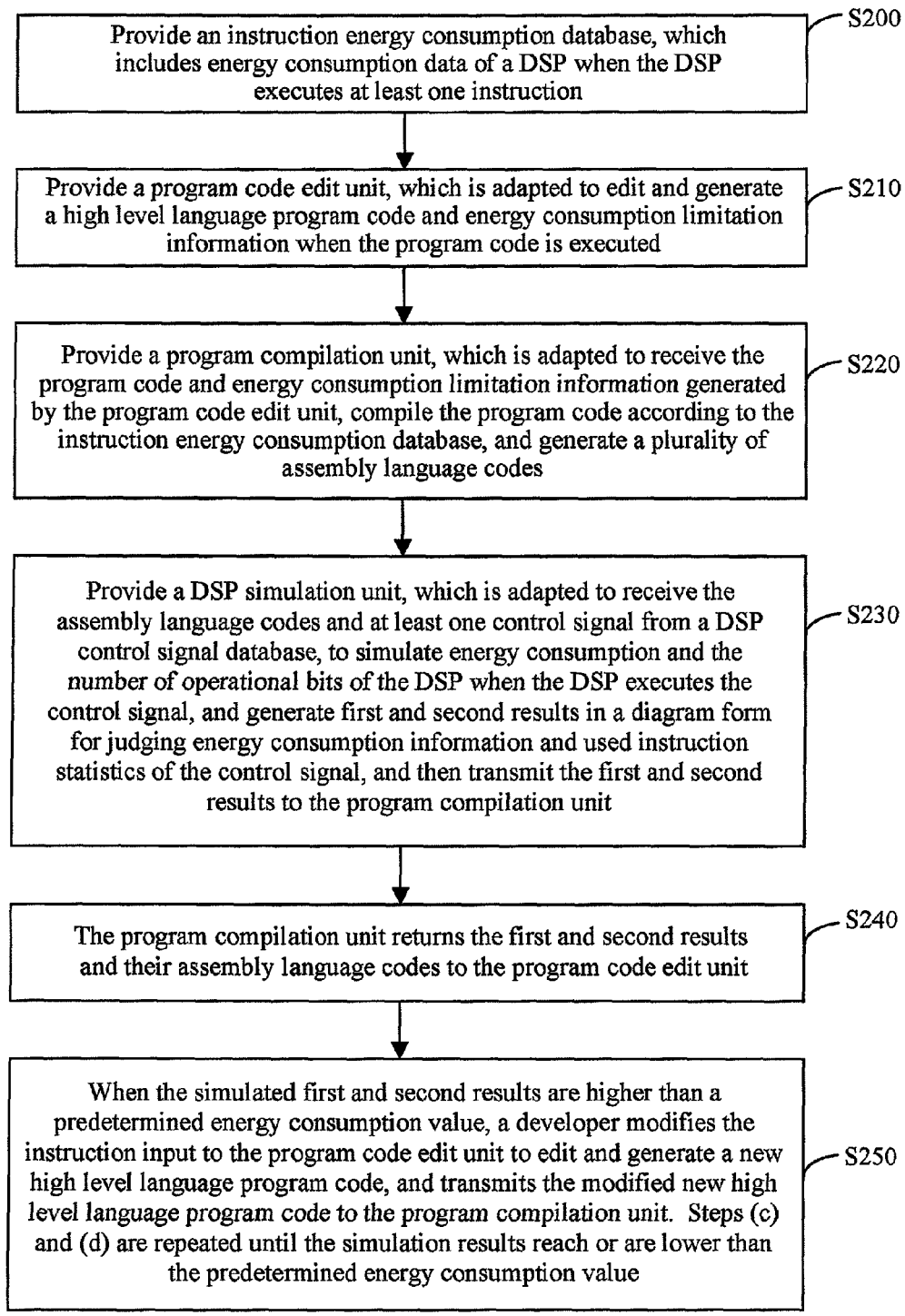
FIG. 3 is a flow chart of a method for optimizing a DSP according to the embodiment in FIG. 1.

FIG. 3 is a flow chart of a method for optimizing an application program for a DSP according to the present invention. Referring to FIG. 3, taking the system according to the embodiment as an example, the method for optimizing an application program for a DSP according to the present invention includes the following steps In Step S200, an instructional wise energy consumption database is provided, which includes energy consumption data of a DSP when the DSP executes at least one instruction. The energy consumption data includes the operational transistor number, operating voltage, operating clock, pipeline quantity, branch quantity, storage bit width, and register bit width of the DSP when the DSP executes the instruction.

In Step S210, a program code generating unit is provided, which is adapted to edit and generate a high level language program code and energy consumption limitation information when the program code is executed.

In Step S220, a program compiling unit is provided, which is adapted to receive the program code and energy consumption limitation information generated by the program code generating unit, and according to the instructional wise energy consumption database, compile the program code and generate a plurality of assembly codes.

In Step S230, a DSP simulator is provided, which is adapted to receive the assembly codes and at least one stimulus from a DSP stimulus database, to simulate energy consumption and used instruction statistics of the DSP when the DSP executes the stimulus, and generate a first and second results in a diagram form for judging energy consumption information and used instruction statistics of the stimulus, and then transmit the first and second results to the program compiling unit. The stimulus is established in the DSP stimulus database by pre-simulating possible stimulus of the DSP.

In Step S240, the program compiling unit returns the first and second results and their assembly codes to the program code generating unit.

In Step S250, when the simulated first and second results are higher than a predetermined energy consumption value, a developer modifies the instruction input to the program code generating unit to edit and generate a new high level language program code, and transmits the modified new high level language program code to the program compiling unit. Steps S220, S230, and S240 are repeated, until the simulation results reach or are lower than the predetermined energy consumption value. When the simulation results reach or are lower than the predetermined energy consumption value, the developer uses the program code conforming to the predetermined energy consumption value as a program file executed by the DSP, and transmits the program code to the program compiling unit, so that the program compiling unit transmits the generated assembly codes to a DSP assembler and a linker, and the DSP executes the assembly codes.

In practice, the DSP simulator can also generate a third result for judging a number of operational bits of the stimulus in Step S230, which is returned to the program code generating unit with the first and second results and their assembly codes by the program compiling unit, such that the developer can judge the energy consumption performance of the DSP when the DSP executes the program code.

In practice, the program code generating unit can also be designed as a DSP program code generation unit, which automatically generates a high level language program code through a program code database, and sends the generated high level language program code to the program compiling unit to perform the subsequent DSP energy consumption simulation step. Then, after analysis results of program energy consumption and operational bits generated by the DSP simulator are received, the program code database generates a comparison program code, and the original program code is replaced by the comparison program code to perform the simulation until the simulation results conform to predetermined energy consumption performance.

Therefore, compared with a conventional DSP development system, the development system and method for optimizing a DSP according to the present invention can consider the operating speed of the DSP and its power consumption in a balanced way; energy consumption performance of the DSP is optimized by simulating the power consumption of the DSP when the DSP executes the program code at the software level, so as to further reduce power loss in various electronic products applying the DSP, particularly portable handheld electronic products. Additionally, the development system and method of the present invention can accelerate development of a DSP applied system, reduce the necessary time consumed at an algorithm development stage, and reduce time needed for system integration and optimization, so as to reduce development time and cost of the DSP.

Therefore, according to the content disclosed in the above, the present invention can achieve the expected objectives, and provide A developing system and method for optimizing a DSP, so that during the development of the DSP, a DSP developer can predict energy consumption information of the DSP when the DSP executes a program code to optimize energy consumption and operational capability of the DSP. The present invention has good industrial applicability, so a patent application is filed according to the law.

What is claimed is:

1. A method of optimizing energy consumption of an application program for a digital signal processor (DSP), comprising:
providing a program code generating unit for providing an interface to compose and edit a set of program code;
providing an instructional wise energy consumption database comprising energy consumption data of the DSP when the DSP executes at least one instruction;
providing a program compiling unit for receiving the program code, and according to the program code and the instructional wise energy consumption database the program compiling unit compiling the program code and generating a plurality of assembly codes; and
providing a DSP simulator for receiving the assembly codes and at least one stimulus, the DSP simulator simulating the assembly codes to estimate the energy consumption of the assembly code when the DSP executes the assembly codes;
wherein when receiving the assembly codes and the stimulus, the DSP simulator generates a first result for simulating the energy consumption of the assembly codes under such stimuli provided by the DSP stimulus test bench database which the first result is in an instructional wise statistical form and with a number represents the total amount of energy consumption, and a second result for simulating the bit-width accuracy tolerability of the instructions in the assembly codes under such stimuli provided by the DSP stimulus test bench database;
wherein the first result is transmitted to the program compiling unit, according to the first result the program compiling unit modifies a compiling scheme to recompile the program code if the first result shows total energy consumption is greater than a limitation which is set by the program code generating unit and generates a new plurality of assembly codes.

2. The method according to claim 1, wherein the energy consumption data of the instructional wise energy consumption database is based on an operational transistor number, an operating voltage, an operating clock, a pipeline management, a branch prediction, a storage bit width, the sequence of instructions, and a register bit width.

3. The method according to claim 1, wherein the program code generating unit further comprises an interface to set a total energy consumption limitation for the program code while the program code is being executed by the DSP, and the interface allows a bit-width adjustment to the program code.

4. The method according to claim 1, wherein the at least one stimulus is stored in a DSP stimulus test bench database, and the DSP stimulus test bench database is established by a combination of all possible real-time scenario stimulus of the application program.

5. The method according to claim 1, wherein the second result is transmitted to the program compiling unit, according to the second result the program compiling unit modifies the compiling scheme to recompile the program code if the second result shows an actual memory space need for an instruction is less than a value which is set by the program compiling unit and convert the assembly code to meet the actual memory space need.

6. The method according to claim 1, wherein the first result and the second result are transmitted to the program code generating unit for editing the program code based on the first result and the second result of the application program.

7. A developing method for optimizing energy consumption of an application program for a digital signal processor (DSP), comprising:
(a) providing a program code generating unit being an interface to compose and edit a set of program code;
(b) providing an instructional wise energy consumption database which includes energy consumption data of the DSP when the DSP executes at least one instruction;
(c) providing a program compiling unit for receiving the program code, and according to the program code and the instructional wise energy consumption database the program compiling unit compiling the program code and generating a plurality of assembly codes;
(d) providing a DSP simulator for receiving the assembly codes and at least one stimulus, the DSP simulator simulating the assembly codes to estimate the energy consumption of the assembly codes when the DSP executes the assembly codes; and
(e) when energy simulation results are higher than a predetermined energy consumption limitation value, the program compiling unit modifying the compiling scheme according to the simulation results, and repeating the steps (d) until the simulation results reach or are lower than the predetermined energy limitation value, otherwise the program compiling unit informing program code generating unit to modify the program code according to the simulation results, and repeating the steps (c) to (e), till the energy consumption limitation value is met;
wherein when receiving the assembly codes and the stimulus in step (e), the DSP simulator generates a first result for simulating the energy consumption of the assembly codes under such stimuli provided by the DSP stimulus test bench database which in an instructional wise statistical form and a number represents the total amount of energy consumption, and a second result for simulating the bit-width accuracy tolerability of the instructions in the assembly codes under such stimuli provided by the DSP stimulus test bench database;
wherein the first result is transmitted to the program compiling unit, according to the first result the program compiling unit modifies a compiling scheme to recompile the program code if the first result shows total energy consumption is greater than a limitation which is set by the program code generating unit and generates a new plurality of assembly codes.

8. The method according to claim 7, wherein the energy consumption data of the instructional wise energy consumption database is based on an operational transistor number, an operating voltage, an operating clock, a pipeline management, a branch prediction, a storage bit width, the sequence of instructions, and a register bit width.

9. The method according to claim 7, wherein the program code generating unit further comprises an interface to set a total energy consumption limitation for the program code, and an interface allow a bit-width adjustment of the program code.

10. The method according to claim 7, wherein the at least one stimulus is stored in a DSP stimulus test bench database, and the DSP stimulus test bench database is established by a combination of all possible real-time scenario stimulus of the application program.

11. The method according to claim 7, wherein the second result is transmitted to the program compiling unit, according to the second result the program compiling unit modifies the compiling scheme to recompile the program code if the second result shows an actual memory space need for an instruction is less than a value which is set by the program code generating unit and convert the assembly code to meet the actual memory space need.

12. The method according to claim 7, wherein the first result and the second result are transmitted to the program code generating unit to edit the program code based on the first result and the second result of the application program.

* * * * *